(12) United States Patent
Hill

(10) Patent No.: US 11,833,855 B1
(45) Date of Patent: Dec. 5, 2023

(54) LOAD WHEEL CHANGING DEVICE

(71) Applicant: Brock Hill, Theodore, AL (US)

(72) Inventor: Brock Hill, Theodore, AL (US)

( * ) Notice: Subject to any disclaimer, the term of this patent is extended or adjusted under 35 U.S.C. 154(b) by 174 days.

(21) Appl. No.: 17/395,189

(22) Filed: Aug. 5, 2021

(51) Int. Cl.
*B60B 30/00* (2006.01)
*B66C 19/00* (2006.01)

(52) U.S. Cl.
CPC ............ B60B 30/00 (2013.01); *B66C 19/005* (2013.01)

(58) Field of Classification Search
CPC .............................. B60B 30/00; B66C 19/005
See application file for complete search history.

(56) References Cited

U.S. PATENT DOCUMENTS

| | | | |
|---|---|---|---|
| 4,684,310 A | 8/1987 | Stange | |
| 6,173,481 B1 | 1/2001 | Parent | |
| 2003/0025347 A1 | 2/2003 | Shwaykowski | |
| 2015/0231923 A1 | 8/2015 | Dillon | |
| 2019/0154194 A1* | 5/2019 | Leblanc | F16M 11/04 |

FOREIGN PATENT DOCUMENTS

| | | |
|---|---|---|
| CN | 2839219 Y | 11/2006 |
| CN | 201841397 U | 5/2011 |
| CN | 103043531 B | 3/2015 |
| CN | 106002837 B | 10/2017 |
| CN | 107651554 A | 2/2018 |

* cited by examiner

*Primary Examiner* — Nirvana Deonauth
(74) *Attorney, Agent, or Firm* — George L Williamson

(57) ABSTRACT

Method and apparatus for a device for connection to and support of a load wheel so that the load wheel can be easily and safely removed from a crane, and transported about as necessary to repair and/or replace the load wheel. The device includes left and right side-plates, left and right bases, left and right rear walls and along with left and right rear connectors which connect to an upper cross-T of a stanchion which is supported on a sliding rail mount which is attachable to the rail upon which the load wheel rolls. The device bolts directly to the bearing housing of the load wheel so that the axle of the load wheel can be carried on the left or right lower bases of the device. The device is then slidable along the rail upon which the load wheel of the overhead or gantry crane travels.

18 Claims, 3 Drawing Sheets

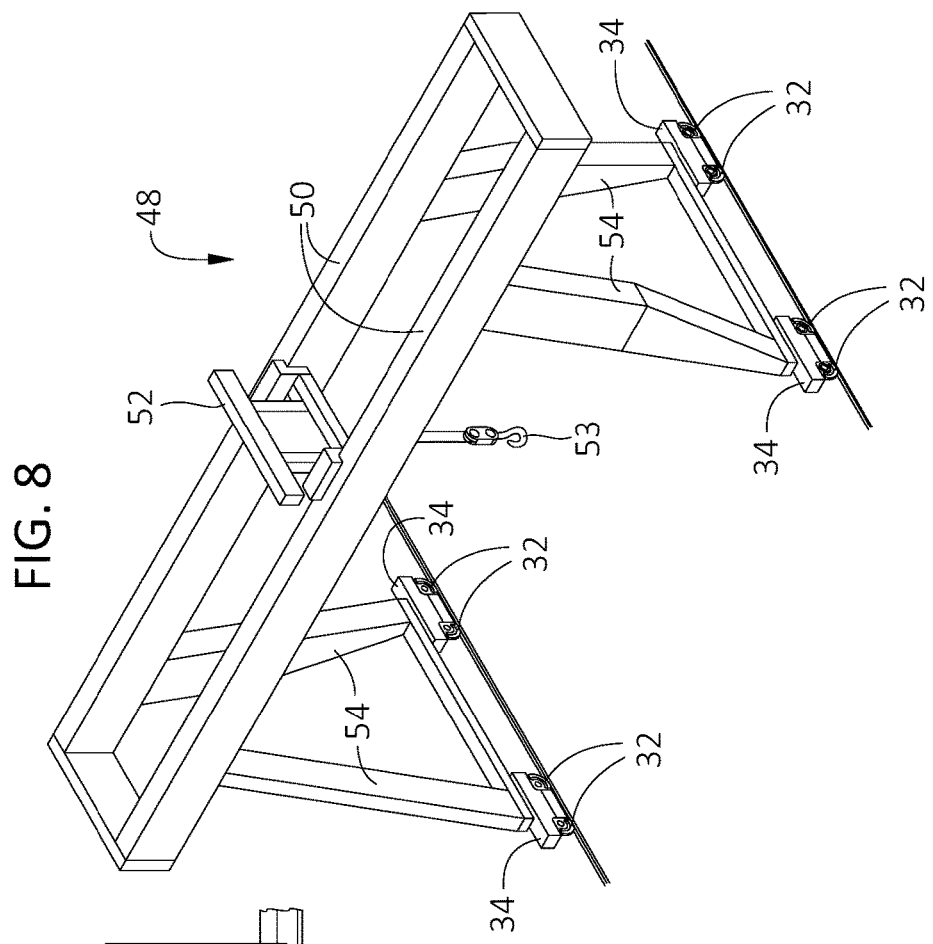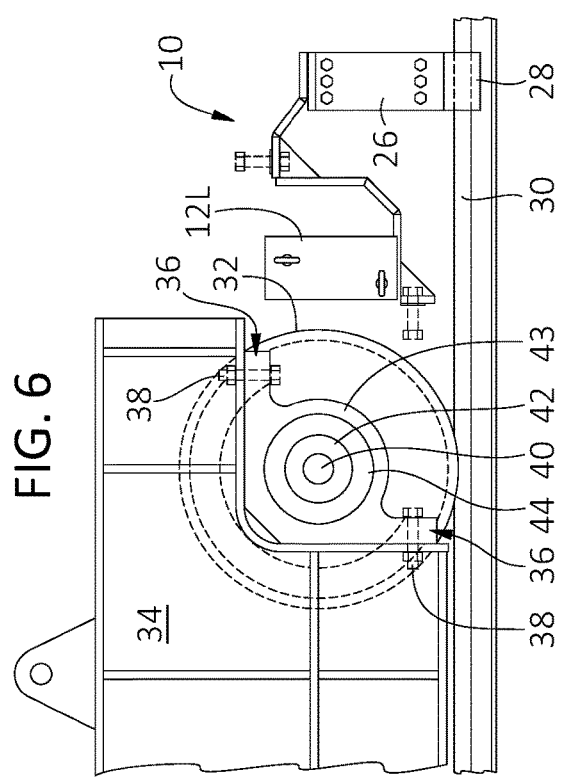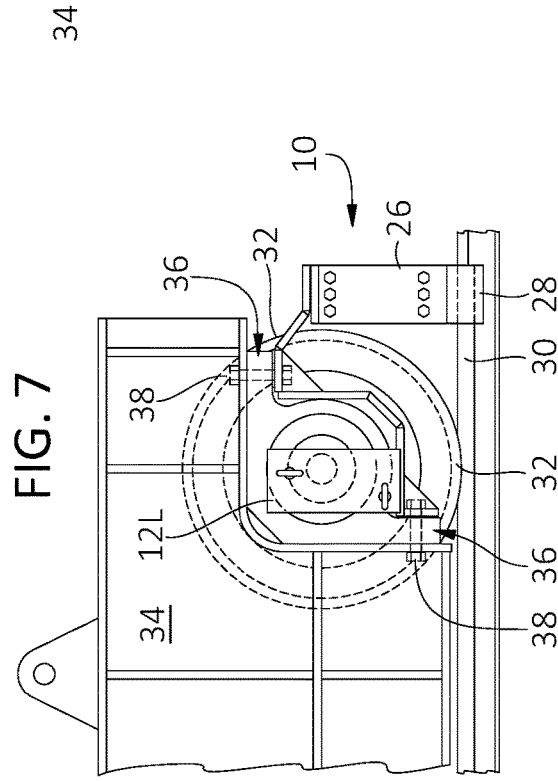

LOAD WHEEL CHANGING DEVICE

BACKGROUND OF THE INVENTION

Field of the Invention

The present invention relates generally to appurtenances for wheels and, more particularly, is concerned with a load wheel changing device for use on overhead or gantry cranes.

Description of the Related Art

Devices relevant to the present invention have been described in the related art, however, none of the related art devices disclose the unique features of the present invention.

In U.S. Patent Application Publication No. 2015/0231923 dated Aug. 20, 2015, Dillon disclosed a method and apparatus for mounting and demounting large wheels. In U.S. Patent Application Publication No. 2003/0025347 dated Feb. 6, 2003, Shwaykowski disclosed a wheel lifting device. In U.S. Pat. No. 6,173,481 dated Jan. 16, 2001, Parent disclosed a wheel removal and reassembly apparatus for brake access on any vehicles. In U.S. Pat. No. 4,684,310 dated Aug. 5, 1987, Stange disclosed a wheel manipulator. In Chinese Patent No. CN 103043531B, the Inventor disclosed a method and device for replacing the wheel group of a bridge crane. In Chinese Patent No. CN 201841397U the Inventor disclosed a trolley rail-wheel dismounting vehicle utensil. In Chinese Patent No. CN 107651554A, the Inventor disclosed a kind of train wheel suspender. In Chinese Patent No. CN 2839219Y, the Inventor disclosed an auxiliary exchanging block tray. In Chinese Patent No. CN 106002837B, the Inventor disclosed a vehicle wheel group auxiliary replacement device.

While these devices may be suitable for the purposes for which they were designed, they would not be as suitable for the purposes of the present invention as hereinafter described. As will be shown by way of explanation and drawings, the present invention works in a novel manner and differently from the related art.

SUMMARY OF THE PRESENT INVENTION

The present invention discloses a cradle-like device for connection to and support of a load wheel so that the load wheel can be easily and safely removed from, e.g., a crane, and transported about as necessary to repair and/or replace the load wheel. The present invention 10 includes left and right side-plates, left and right bases, left and right rear walls and along with left and right rear connectors which connect to an upper cross T of a stanchion which is supported on a sliding rail mount which is attachable to the rail upon which the load wheel rolls. The present invention operates in a hands-free manner providing worker safety and is 100% secured to the type load wheels such as would be used on the overhead or gantry crane. The present invention does this by bolting to the bearing housing or L-block of the bearing housing of the load wheel so that the axle of the load wheel can be carried on the left or right lower bases within the cradle of the present invention. The present invention is then slidable along the rail upon which the load wheel of the overhead or gantry crane travels. Once the present invention is moved away from the overhead or gantry crane so as to be clear of any obstructions, the load wheel can then be lifted up with a mobile crane using a plurality of lifting points that are attached to the left and right side walls of the present invention so that the load wheel and its bearing housing are maintained on a level orientation at all times and in the same position as on the crane.

An object of the present invention is to easily and safely remove a load wheel of an overhead or gantry crane. A further object of the present invention is to stabilize the load wheel as it is removed from the overhead/gantry crane. A further object of the present invention is to maintain the load wheel in the same vertical position as on the crane so that the load wheel is maintained in the same position as on the crane. A further object of the present invention is to improve safety to the workers who are required to remove and replace the load wheel on an overhead/gantry crane. A further object of the present invention is to provide a means for removing the load wheel of an overhead/gantry crane which can be relatively easily used by an operator. A further object of the present invention is to provide a device which can be easily and inexpensively manufactured.

The foregoing and other objects and advantages will appear from the description to follow. In the description reference is made to the accompanying drawings, which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWINGS

In order that the invention may be more fully understood, it will now be described, by way of example, with reference to the accompanying drawings in which:

FIG. 6 is a left side elevation view of the present invention shown in proximate position with a carriage and a load wheel.
FIG. 7 is a left side elevation view of the present invention shown in operative connection with a load wheel.
FIG. 8 is a perspective view of a gantry crane.

LIST OF REFERENCE NUMERALS

Figure 1:
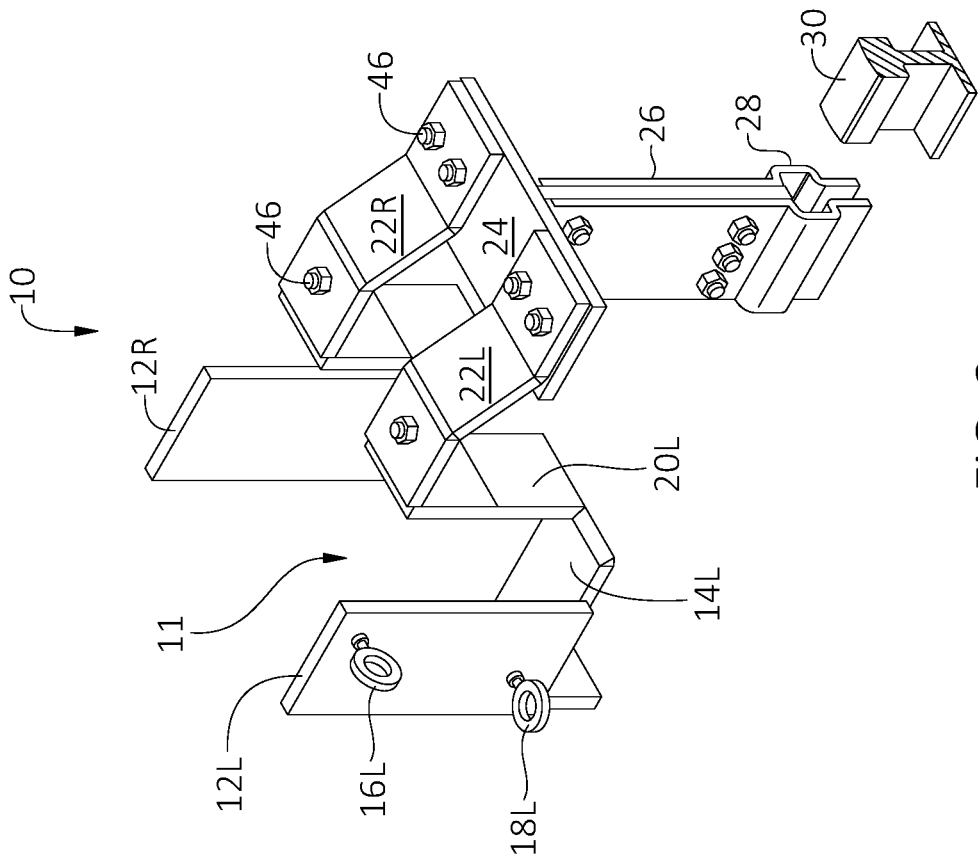
FIG. 1 is a front perspective view of the present invention.

With regard to reference numerals used, the following numbering is used throughout the drawings.
10 present invention
11 cradle/receptacle and space
12L left side plate
12R right side plate
13L left front downwardly extending front plate
13R right front downwardly extending front plate
14L left lower base
14R right lower base
16L left upper lifting hook
16R right upper lifting hook 18L left lower lifting hook
18R right lower lifting hook
20L left rear wall
20R right rear wall
22L left rear connector
22R right rear connector
24 upper cross-T
26 stanchion member
28 sliding rail clamp
30 rail
32 load wheel of gantry crane
34 carriage of gantry crane
36 L block of wheel bearing housing
38 fasteners
40 axle
42 inner bearing race of axle
43 bearing housing
44 outer bearing race of axle
46 fasteners
48 crane/gantry/gantry crane
50 cross girder
52 trolley
53 hoist
54 support legs

DETAILED DESCRIPTION OF THE PREFERRED EMBODIMENT

Figure 2:
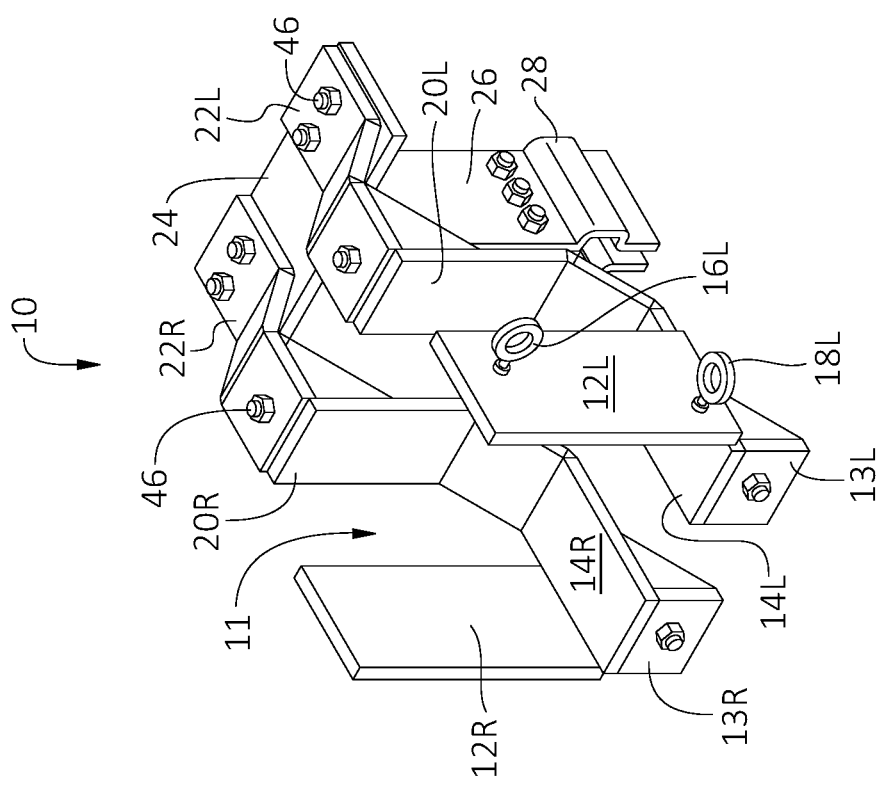
FIG. 2 is a rear perspective view of the present invention.
Figure 4:
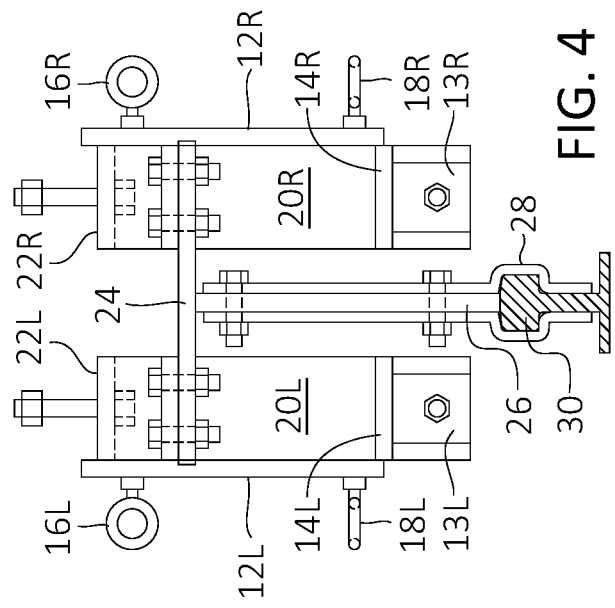
FIG. 4 is a rear elevation view of the present invention.
Figure 5:
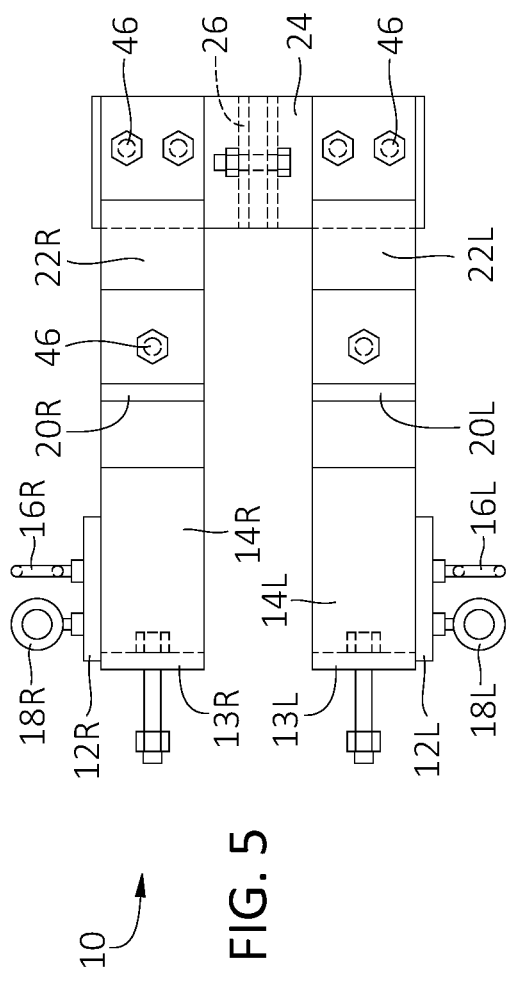
FIG. 5 is a plan view of the present invention.
Figure 3:
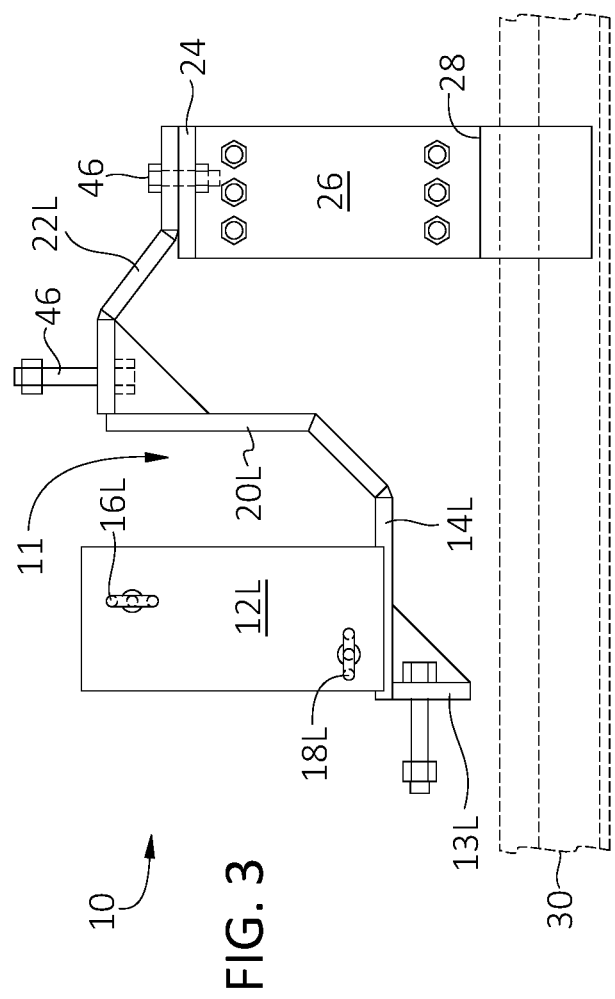
FIG. 3 is a left side elevation view of the present invention.

The following discussion describes in detail at least one embodiment of the present invention. This discussion should not be construed, however, as limiting the present invention to the particular embodiments described herein since practitioners skilled in the art will recognize numerous other embodiments as well. For a definition of the complete scope of the invention the reader is directed to the appended claims. FIGS. 1 through 8 illustrate the present invention wherein a load wheel changing device for an overhead/gantry crane is disclosed and which is generally indicated by reference number 10.

Turning to FIGS. 1 to 5, therein is shown the present invention 10 which may be referred to as a load wheel changing device which is designed to provide a cradle or receptacle 11 and its provided space for containing and holding the load wheel of the overhead/gantry crane therein. The present invention 10 has a left and right side-plate 12, a left and right downwardly extending front plate 13, a left and right lower base member 14, left and right lower and upper lifting hooks 16, 18, left and right rear walls 20, left and right rear connectors 22, an upper cross T member 24, an upright stanchion member 26 and a sliding rail clamp 28 being slidable on rail 30. The left and right side-plates 12, the left and right lower bases 14, and the left and right rear walls 20 together form a cradle/receptacle having a space 11 therein for holding the load wheel in a level and upright stable position while the load wheel is being removed or replaced onto an overhead/gantry crane. Also shown is a portion of a rail 30 upon which the load wheel of the overhead/gantry crane and the sliding rail clamp 28 of the present invention 10 can slide. A plurality of fasteners 46 in the form of nuts and bolts are provided for joining the members of the present invention 10 together as would be done in the standard manner by one skilled in the art Turning to FIG. 6, therein is shown the present invention 10 along with the load wheel or crane wheel 32 in a mounted position on carriage 34, which wheel is rollable along the rail 30 as would be done by one skilled in the art in the standard manner. Only a portion of the carriage 34 of the overhead/gantry crane (not shown bur see FIG. 8) is shown which is supported by a plurality of load wheels 32. Each load wheel 32 is connected to a portion of the carriage 34 by using a wheel block bearing housing or L-block 36 or the like as would be done in the standard manner by one skilled in the art. The wheel block bearing housing 36 is connected to a portion of the underside of the carriage 34 using a plurality of nuts-and-bolts fasteners 38, each of which includes a nut and bolt as would be done in the standard manner by one skilled in the art. The wheel L block bearing housing 36 includes a central axle 40 which is carried on an inner bearing race 42 and includes an outer bearing race 44 for being supported inside the wheel L block bearing housing 36.

Turning to FIG. 7, therein is shown the present invention 10 connected to the wheel L block bearing housing 36 of the load wheel 32 by having its left and right downwardly extending front plates 13 connected to the downwardly extending portion of the L block bearing housing 36 and having its left and right rear connectors 22 connected to the horizontal portion of the L block bearing housing 36. Once the present invention 10 is secured to the L-block bearing housing 36, the wheel 32 can then be safely removed from the carriage 34 of the overhead/gantry crane by sliding the rail clamp 20 on the rail 30 away from the carriage 34 of the overhead/gantry crane.

Turning to FIG. 8, therein is shown gantry 48 or gantry crane or what may be referred to as simply a crane having a plurality of support legs 54 and including cross girders 50, and a hoist 53 mounting on a movable trolley 52. The legs 54 are supported on a carriage 34 which are carried on a load wheel 32 which may be referred to as simply a wheel.

In operation the present invention 10 is used in conjunction with a hydraulic ram jack which is used to lift or support a carriage 34 of the overhead/gantry crane while the load wheel 32 is being removed from or installed onto the crane. The present invention 10 is positioned proximate to the carriage 34 while the ram jack is used to support the carriage 34 of the crane and the L-blocks are disconnected from the carriage 34 and then reconnected to the connection points of the present invention 10 as shown in FIG. 6 and in FIG. 7. The present invention 10 supports the load wheel bearing housing 36 on the inboard and outboard of the load wheel 32, i.e., the inboard and outboard bearing housings rest in the cradle 11. Once the present invention 10 is secured to the L-block bearing housing 36, then the load wheel 32 can be safely removed from a carriage 34 of the crane.

A typical gantry crane 48 is simply a crane built atop a gantry, which is a structure used to straddle an object or workspace. They can range in size from being enormous gantry cranes, capable of lifting some of the heaviest loads in the world, to small shop cranes, used for tasks such as lifting automobile engines out of vehicles. The terms gantry crane and overhead crane (or bridge crane) are often used interchangeably, as both types of crane straddle their workload and may carried on rails 30 or wheels 32. By contrast, the supporting structure of an overhead crane is normally fixed in location, often in the form of the walls or ceiling of a building, to which is attached a movable hoist running overhead along a rail or beam (which may itself move). Further confusing the issue is that gantry cranes may also incorporate a movable beam-mounted hoist in addition to the entire structure being wheeled, and some overhead cranes are suspended from a freestanding gantry. As used in this patent application with respect to the present invention 10, the terms gantry, gantry crane, and crane are interchangeable.

Left and right side designations regarding the present invention 10 are interpreted from the view of one looking from the stanchion 26 toward the space 11.

By way of summary and by reference to FIGS. 1-8, the present invention 10 may be described as a wheel support system for removal and replacement of the wheel 32 including and supporting a gantry 48 having a carriage 34 supported by at least one load wheel 32 mounted for rotation on an axle 40, the wheel being supported on the axle by a bearing housing 43, a rail 30, being supported and capable of supporting great weight which may be ground supported or elevated, positioned for the load wheel to roll along a top surface of the rail, and, cradle apparatus, construction or assembly 11 slidable on the rail for engaging the bearing housing for rolling the load wheel and bearing housing/ assembly directly away from the wheel's mounted position (see FIG. 6) on the crane or gantry along the rail for repair or replacement, and whereby the wheel support system operates in a hands-free manner providing worker safety. Furthermore, the cradle apparatus comprises a rail clamp 28 for sliding along the rail, a stanchion member 26 extending up from the rail clamp, and a cradle assembly 11 supported on an upper end of the stanchion member for accommodating the load wheel, in which the cradle assembly comprises a pair of spaced rear connectors 22L, 22R extending from the stanchion toward the load wheel 32, each rear connector having an upright plate 12L, 12R for accommodating the load wheel therebetween when the cradle assembly is rolled to engage the load wheel, in which each upright plate has a forwardly extending horizontal base plate 14L, 14R extending from a respective upright plate under the bearing housing, having means for attaching a selected upright plate to the load wheel, in which the means comprises one or more lifting hooks 16L, 16R, 18L, 18R, in which the upright plates and forwardly extending base plates form a receptacle 11 for holding the load wheel in a level and upright stable position while the load wheel is rolled away on the rail for removal or replacement onto the overhead gantry/crane, in which a horizontal upper cross-T plate 24 is mounted on the upper end of the stanchion supports proximal ends of the rear connectors, and in which a lower portion of the stanchion has the clamp enclosing an upper portion of the rail allowing the stanchion to slide along the rail.

I claim:

1. A wheel support system for removal and replacement of at least one load wheel of a gantry, comprising:
   a) a gantry having a carriage supported by said at least one load wheel mounted for rotation on an axle, said at least one load wheel being supported on said axle by a bearing housing;
   b) a rail positioned for said at least one load wheel to roll along a top surface of said rail; and
   c) a cradle assembly slidable on said rail for engaging said bearing housing for rolling said at least one load wheel and said bearing housing directly away from a mounted position of said at least one load wheel on said gantry along said rail for repair or replacement, and whereby said support system operates in a hands-free manner providing worker safety.

2. The wheel support system of claim 1, in which said cradle assembly comprises a rail clamp for sliding along said rail, with a stanchion member extending up from said rail clamp, and said cradle assembly supported on an upper end of said stanchion member for accommodating said at least one load wheel.

3. The wheel support system of claim 2, in which said cradle assembly comprises a pair of spaced rear connectors extending from said stanchion toward said at least one load wheel, each rear connector having an upright plate for accommodating said at least one load wheel therebetween when said cradle assembly is rolled to engage said at least one load wheel.

4. The wheel support system of claim 3, in which each said upright plate has a forwardly extending horizontal base plate extending from a respective upright plate of said upright plates under said bearing housing.

5. The wheel support system of claim 4, having means for lifting said cradle assembly containing said at least one load wheel.

6. The wheel support system of claim 5, in which said means comprises one or more lifting hooks.

7. The wheel support system of claim 5, in which said upright plates and forwardly extending base plates form a receptacle for holding the at least one load wheel in a level and upright position while the at least one load wheel is rolled away on said rail for removal or replacement onto said gantry.

8. The wheel support system of claim 7, in which a horizontal upper cross-T plate is mounted on said upper end of said stanchion member for joining to said rear connectors.

9. The wheel support system of claim 8, in which a lower portion of said stanchion member has said rail clamp enclosing an upper portion of said rail allowing said stanchion member to slide along said rail.

10. A method of removing at least one load wheel from a gantry for replacement or repair, comprising the steps of:
    a) providing a gantry having a carriage supported by the at least one load wheel mounted for rotation on an axle, said at least one load wheel being supported on said axle by a bearing housing;
    b) providing a rail for said at least one load wheel to roll along a top surface of said rail directly from a mounted position of said at least one wheel in said carriage; and
    c) sliding a cradle assembly on said rail for engaging said bearing housing for rolling said at least one load wheel along said rail away from said gantry for repair or replacement, whereby said method operates in a hands-free manner providing worker safety.

11. The method of claim 10, in which said cradle assembly comprises a rail clamp slidable along said rail, with a stanchion member extending up from said rail clamp, and said cradle assembly supported on an upper end of said stanchion member for accommodating said at least one load wheel.

12. The method of claim 11, in which said cradle assembly comprises a pair of spaced rear connectors extending from said stanchion toward said at least one load wheel, each said rear connector having an upright plate for accommodating said at least one load wheel therebetween when said cradle assembly is slid to engage said at least one load wheel.

13. The method of claim 12, in which each said upright plate has a horizontal base plate extending from a respective upright plate of said upright plates under said bearing housing.

14. The method of claim 13, including a step of lifting said cradle assembly containing said at least one load wheel.

15. The method of claim 14, in which lifting hooks are used for lifting each said upright plate and said at least one load wheel.

16. The method of claim 14, in which said upright plates and forwardly extending base plates form a receptacle for holding the at least one load wheel in a level and upright position while the at least one load wheel is rolled away on said rail for removal or replacement onto said gantry.

17. The method of claim 16, in which a horizontal upper cross-T plate is mounted on said upper end of said stanchion member for joining to said rear connectors.

18. The method of claim 17, in which a lower portion of said stanchion member has the rail clamp enclosing an upper portion of said rail clamp allowing said stanchion member to slide along said rail.

\* \* \* \* \*